United States Patent
Lapeyre

[11] 4,005,504
[45] Feb. 1, 1977

[54] METHOD FOR PARTIALLY PEELING SHRIMP

[75] Inventor: Fernand S. Lapeyre, New Orleans, La.

[73] Assignee: The Laitram Corporation, New Orleans, La.

[22] Filed: Sept. 5, 1975

[21] Appl. No.: 610,676

Related U.S. Application Data

[62] Division of Ser. No. 454,586, March 25, 1974, abandoned.

[52] U.S. Cl. .................. 17/48; 17/73; 426/479; 426/518
[51] Int. Cl.[2] ...................... A22C 29/00
[58] Field of Search .......... 426/518, 479, 643, 483, 426/480, 482; 17/73, 71, 72, 48, 49, 45; 99/574, 585

[56] References Cited

UNITED STATES PATENTS

| 2,853,733 | 9/1958 | Greiner | 17/73 |
| 3,310,832 | 3/1967 | Ambos et al. | 17/48 |
| 3,423,788 | 1/1969 | Lapeyre | 17/71 |
| 3,430,288 | 3/1969 | Lapeyre | 17/73 |
| 3,465,383 | 9/1969 | Willis et al. | 17/73 |
| 3,466,699 | 9/1969 | Willis et al. | 17/73 |

Primary Examiner—S. Leon Bashore
Assistant Examiner—Kenneth M. Schor
Attorney, Agent, or Firm—Wilkinson, Mawhinney & Theibault

[57] ABSTRACT

The present disclosure is directed to an improved method and machine for peeling shrimp for the fantail and butterfly shrimp market in which only certain desired segments of the shrimp shell are removed from the raw uncooked shrimp. The method assumes that prior to peeling the desired shell segments 1 through 5 from the raw shrimp that the back of the shrimp shell of segments 1 through 5 has been cut open and the condyle hinges between shell segments 5 and 6 have been broken. In the method of this disclosure the shrimp are fed lengthwise and individually one after another to a friction type peeling nip of short length. The rollers forming the nip are rotated in opposite directions during the peeling action and simultaneously while being peeled the individual shrimp is induced to move lengthwise along and beyond the peeling nip with its shell being pinched off from the ventral side of the shrimp meat in a progressive manner and sequentially one segment after another along its length except for the tail and sixth segment which are not exposed to the peeling action of the nip.

1 Claim, 3 Drawing Figures

METHOD FOR PARTIALLY PEELING SHRIMP

This is a division of application Ser. No. 454,586, filed Mar. 25, 1974, now abandoned.

An object of the present invention is to provide a simple method of removing the shell segments 1 through 5 of the shrimp which previously have had their shell segments 1 through 5 cut open on the dorsal side of the shrimp and which also previously have had their condyle hinges broken between shell segments 5 and 6.

A further object of the invention is to provide a frictional type peeling nip along which the shrimp is moved lengthwise while simultaneously the nip operates to remove progressively and sequentially shell segments 5 through 1 to leave only the 6th shell segment, telson and uropods intact with the whole shrimp meat. In certain prior patents teaching peeling shrimp by frictional means such as U.S. Pat. Nos. 3,430,288 and 3,324,504 and directed to preparing shrimp for the fantail and butterfly breaded shrimp market the shrimp does not move lengthwise along the peeling nip during the peeling or removal of shell from segments 5 through 1.

A further object of the present invention is to provide a simple machine with a single frictional type peeling nip adaptable to single file feeding of shrimp rapidly one behind another to peel shrimp for the fantail or butterfly market. Numerous devices have been advanced for handling the shrimp through the condyle hinge breaking stage and during the cutting of the back to open the shell segments 1 through 5 to permit stripping away the shell of only those segments leaving the 6th shell segment, telson and uropods intact with the shrimp meat, but the use of a short friction type peeling nip which not only allows but induces the shrimp to move along the nip and over the end of the nip in the direction of advance of the shrimp is the particular feature of the present invention.

With the foregoing and other objects in view, the invention will be more fully explained in the following specification and pointed out in the drawings in which.

Figure 3:
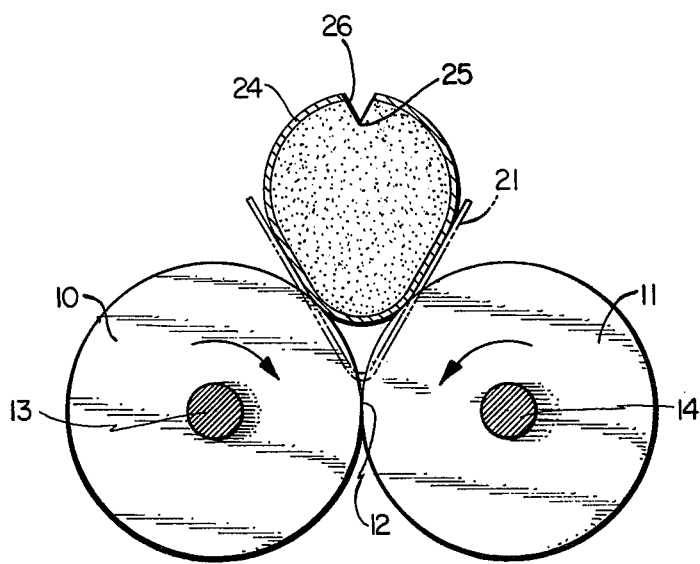
FIG. 3 is a vertical section taken on line 3—3 in FIG. 2.
Figure 2:
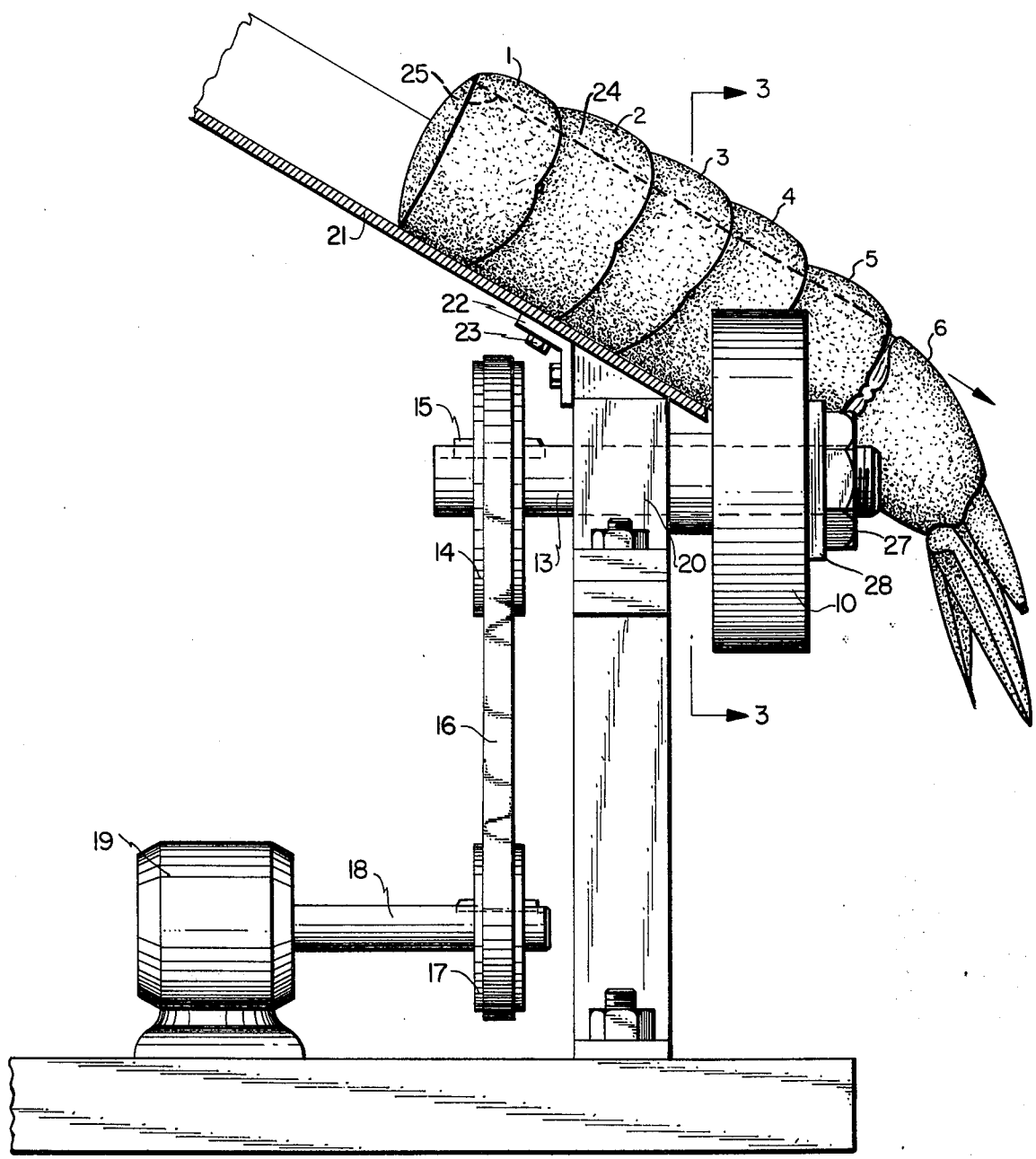
FIG. 2 is a side elevational view with parts broken away and parts shown in sections of one form of apparatus for practicing the method of the present invention.

Referring now to FIGS. 2 and 3, 10 and 11 represents short rollers positioned to define a nip 12. The rollers 10 and 11 are mounted on shafts 13 and 14 for rotation in the direction of the arrows shown in the FIG. 3. The surfaces of the two rollers 10 and 11 at the line of the nip 12 may be closely proximate in which case the rollers would be independently driven or the surfaces of the rollers 10 and 11 at the line of the nip 12 may be in frictional contact as shown in FIG. 3 in which case only one of the rollers need be driven, the second being driven by frictional engagement with the periphery of the first. Secured to the shaft 13 is a pulley 14 which is in driving engagement therewith by key 15. The pulley 14 and its connected shaft 13 are driven by a V-belt 16 which is driven by a pulley 17 keyed to the output shaft 18 of an electric motor 19. When the motor 19 drives the shaft 18 the V-belt drive 16 will cause rotation of the shaft 13 causing the peeling nip to be activated with the caster rollers 10 and 11 rotating in the direction of the arrows in FIG. 3. Supported above the bearing mount 20 for the shafts 13 and 14 is a supply trough 21 generally of V-shape construction as seen in FIG. 3. This trough 21 is secured by brackets 22 and metal screws 23. As shown in the FIG. 3 the V-shaped trough 21 positions the shrimp 24 to be presented in its lengthwise direction and in practicing the present method the shrimp as shown in FIG. 2 has had its condyle hinges broken between shell segments 5–6 and its back cut through on the dorsal side of the shrimp along segments 5 through 1 as along line 25 to the preferred depth as shown in FIG. 3 at 26 to permit the peeling nip 12 to frictionally grasp the sides of the shrimp shell and pull the shell segments 5 through 1 in this order as shown in FIG. 2 through the peeling nip to leave a shrimp with all the shell removed from meat segments 5 through 1 but still leaving the shell intact on the sixth segment as well as on the telson and uropods.

Figure 1:
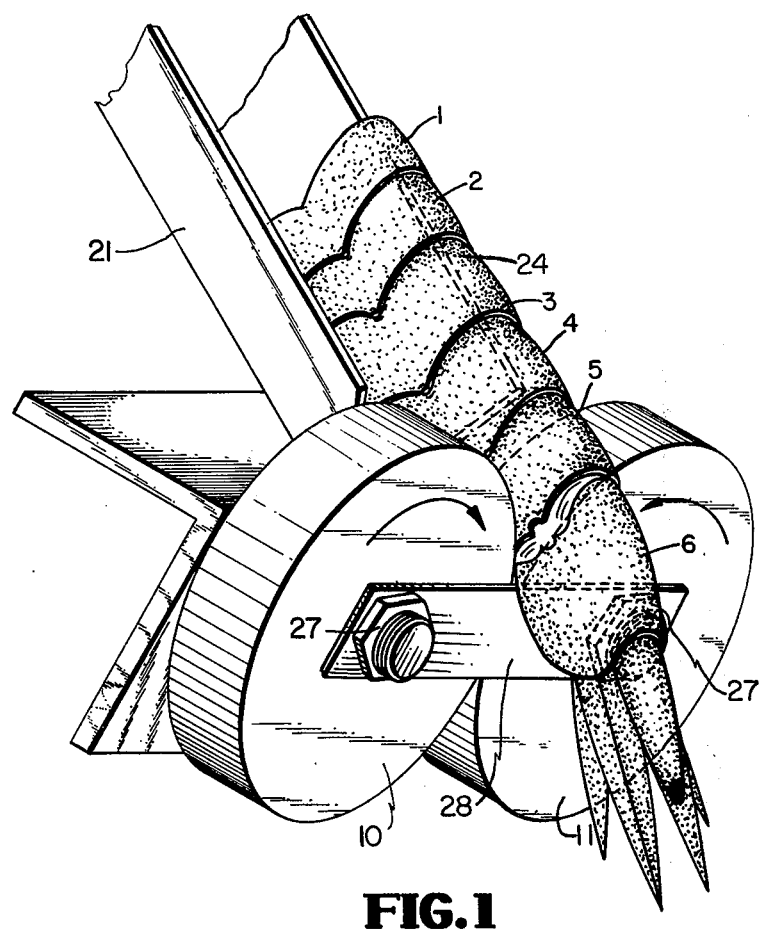
FIG. 1 is a perspective view of one form of shrimp peeling device employed in practicing the method of the present invention.

As shown in FIG. 1 forward of the caster rollers 10 and 11 a ledge 28 may be provided to support the partially peeled shrimp on its movement from the peeling nip to insure no mutilation of the meat at this point.

The anatomy of a shrimp referred to herein after is shown in great detail in my prior U.S. patent 3,423,788 particularly as to segments, dorsal and ventral sides and is herein incorporated by reference.

The method of the present invention is the partial peeling of shrimp which have previously had their condyle hinges at the 5–6 joint broken and their shells cut open along their backs or dorsal line of segments 1 through 5 comprising the step of further subjecting the shrimp to a peeling nip the direction of movement of the peeling surfaces being shown by the arrows in FIGS. 1 and 3. The shrimp are individually moved lengthwise, tail end first as shown in FIG. 2 in such a manner that the shrimp progress lengthwise along the nip sequentially exposing to the peeling action of the nip segments 5, 4, 3, 2, 1. The sixth segments are not cut and these segments as well as the telson and uropods of the shrimp are not exposed to the action of the peeling nip so that this portion of the rigid exo-skeletal structure of the shrimp are retained intact and provide shrimp for the fantail or the butterfly market which may be ultimately breaded for deep fat frying by the consumer.

The lengthwise movement of the shrimp tail first along the nip is induced when the generally downwardly moving peeling surfaces of the peeling rollers 10 and 11 frictionally engage the shell of segment five on its ventral side and draws the shell of segment five downward. The slippery peeled meat is squeezed from the shell and moved forward tail first due to the angle of the trough supported shrimp to the peeling nip and the downward frictional pull by the roller nip sequentially on the shell segments 5, 4, 3, 2, 1 which are firmly connected together by the condyle hinges on both sides of the shrimp at each joint between the above sequentially adjoining segments.

What I claim is:

1. The method of peeling only certain desired shell segments from shrimp which have previously had their condyle hinges broken at the 5–6 joint and the backs of their shell segments 1 through 5 cut through comprising:
   a. subjecting the shrimp for peeling segments 1 through 5 therefrom to the peeling action of a nip formed between a pair of narrow peeling rolls with peeling forces applied to both sides of the shrimp progressively from shell segments 5 through 1 downwardly in a direction essentially from the dorsal to the ventral side of the shrimp, and b. simultaneously moving the shrimp lengthwise down an inclined trough past the peeling nip tail end leading while the shell segments 5 through 1 progressively removed from the shrimp wherein said peeling rolls are thinner than the length of said shrimp and the force imparted by the rolls advances the shrimp past the peeling nip.

* * * * *